US005549170A

United States Patent [19]
Barrow

[11] Patent Number: 5,549,170
[45] Date of Patent: Aug. 27, 1996

[54] SONIC DRILLING METHOD AND APPARATUS

[76] Inventor: Jeffrey Barrow, 649 College St., Woodland, Calif. 95695

[21] Appl. No.: 429,818

[22] Filed: Apr. 27, 1995

[51] Int. Cl.$^6$ .............................. E21B 7/20; E21B 7/24
[52] U.S. Cl. ........................ 175/55; 175/22; 175/171
[58] Field of Search ........................... 175/20, 21, 55, 175/56, 171; 405/232, 238, 249

[56] References Cited

U.S. PATENT DOCUMENTS

| | | | |
|---|---|---|---|
| 3,375,884 | 4/1968 | Bodine Jr. | 175/22 |
| 3,379,263 | 4/1968 | Bodine Jr. | 175/55 X |
| 3,384,188 | 5/1968 | Bodine Jr. | 175/55 |
| 3,394,766 | 7/1968 | LeBelle | 175/55 X |
| 4,403,665 | 9/1983 | Bodine | 175/55 |
| 4,471,838 | 9/1984 | Bodine | 166/249 |
| 4,487,554 | 12/1984 | Bodine | 417/241 |
| 4,527,637 | 7/1985 | Bodine | 175/55 |
| 4,548,281 | 10/1985 | Bodine | 175/55 |
| 4,615,400 | 10/1986 | Bodine | 175/55 |
| 4,693,326 | 9/1987 | Bodine | 175/55 |
| 4,702,315 | 10/1987 | Bodine | 166/249 |
| 4,817,712 | 4/1989 | Bodine | 166/249 |
| 4,836,299 | 6/1989 | Bodine | 175/22 |
| 4,848,486 | 7/1989 | Bodine | 175/55 |
| 5,417,290 | 5/1995 | Barrow | 175/22 X |

*Primary Examiner*—David J. Bagnell
*Attorney, Agent, or Firm*—Limbach & Limbach L.L.P.

[57] ABSTRACT

A drill string is advanced into the ground by inducing vibrations in the drill string at a resonant frequency. The drill string has an opening at a downhole end leading to a hollow interior. As drilling progresses, a core enters the hollow interior. A casing is driven around the drill string to seal the borehole. Sonic advancing of the drill string minimizes waste materials and can be operated without a circulating fluid.

37 Claims, 8 Drawing Sheets

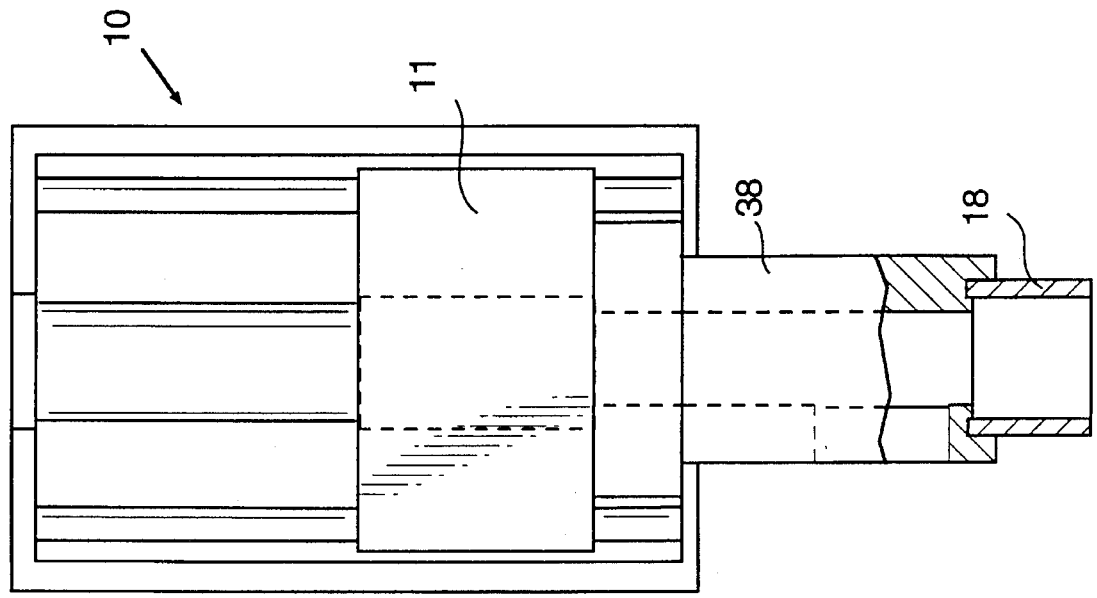
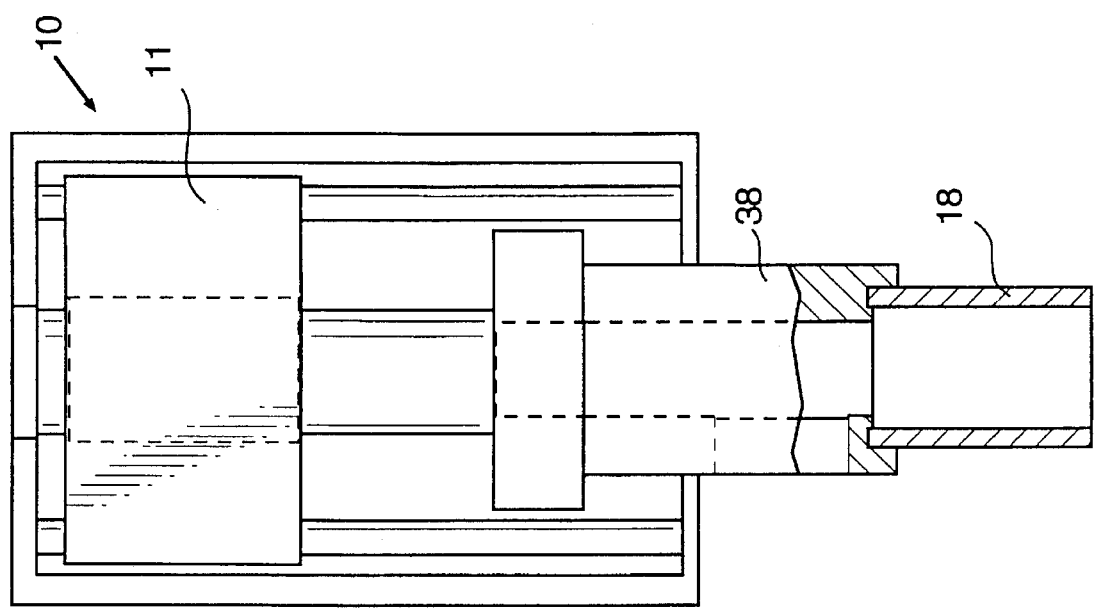

SONIC DRILLING METHOD AND APPARATUS

BACKGROUND OF THE INVENTION

The present invention is directed to a method of removing material from a subsurface and is particularly useful for drilling, well construction, and recovering soil, soil gas, and groundwater samples.

A casing is often used when removing material from a subsurface. The casing seals the borehole, prevents cross-contamination of aquifers and the borehole environment, and prevents the borehole from caving in as drilling progresses. The casing also provides a conduit for well casing, sand, bentonite and cement.

A known technique for casing a borehole is commonly referred to as air rotary casing hammer. A hollow rotary drill pipe having a drill bit at the downhole end is used to cut through the formation. The casing, which surrounds the drill pipe, is driven into the formation using a hammer which pounds the casing into the formation with a number of successive blows. The bottom of the casing has a drive shoe to facilitate penetration of the formation.

Rotary drilling produces cuttings which must be removed for continued drilling. Air or mud is introduced through the interior of the drill pipe as a circulating medium to remove the cuttings. The air or mud flows down the hollow interior of the drill pipe to the bottom of the borehole and circulates back up the borehole in the annular area between the drill pipe and casing. The air or mud and cuttings are then discharged into a hopper for subsequent analysis, treatment and/or disposal.

A problem with air rotary casing hammer is the production of waste products due to the use of a circulating medium and the fact that rotary drilling produces cuttings which must be removed for continued drilling. When operating below the water table, air rotary drilling also brings a substantial amount of water out of the formation which must be disposed of. The fluid and cuttings must be stored, tested, treated, and disposed of in accordance with strict Federal and State regulations when working in a potentially contaminated formation. Transportation, testing, treatment and disposal of the fluid and cuttings significantly increases the cost involved with the drilling, sampling and/or well construction.

Another problem with air rotary casing hammer is that the circulating air can carry contaminated dust and water vapor outside the borehole and into the environment.

SUMMARY OF THE INVENTION

The present invention solves the problems associated with air and mud rotary casing hammer by providing a sonic drilling assembly which minimizes the amount of cuttings produced. Sonic drilling methods and apparatus are disclosed in U.S. Pat. Nos. 4,836,299, 4,548,281 and 5,417,290, which are herein incorporated by reference.

Sonic drilling is accomplished by vibrating a drill string to produce compressive and expansive waves in the drill string. The vibrations are induced in a longitudinal direction of the drill string and the drill string is preferably vibrated at a resonant frequency. The resonant frequency is dependent upon a number of factors including the length of the drill string.

The vibrational forces on the drill string causes the drill string to contract and expand in the longitudinal direction. The vibrational forces at the bottom of the drill string shear, displace and/or otherwise fracture apart the soil particles thereby cutting through the formation.

The drill string preferably includes a number of drill rods which are connected together end-to-end. A sample barrel may be attached to one of the drill rods at a downhole end of the drill string. The sample barrel has an open end leading to a hollow interior which receives a continuous core of the formation. Although the term "sample barrel" is used herein, the sample barrel may also be used for drilling rather than sampling.

Sonic drilling provides clear advantages over the gross sampling method of rotary drilling since near in-situ quality core samples are produced. When it is desired to collect a soil sample, the drill string is recovered from the subsurface and the material is saved for subsequent testing.

It has been found that sonic drilling advantageously minimizes the amount of waste produced during drilling and, in some applications, no waste is produced other than the core sample itself. Formation material not taken as sample into the hollow interior of the sample barrel is displaced back into the formation. The fluidization of the cuttings around the drill string permits the cuttings to be reabsorbed by the formation. The minimization of cuttings and waste advantageously reduces the cost of storing, transporting, testing, treating and disposing of the cuttings.

Furthermore, sonic drilling does not require a circulating medium since the cuttings are reabsorbed into the formation. Air and mud rotary drilling, on the other hand, requires a circulating medium to remove the cuttings from the borehole for continued drilling. When working in a potentially contaminated site, the present invention does not require a circulating medium and, therefore, there is no need to save, analyze, treat and dispose of the circulating medium and cuttings.

Sonic drilling is particularly useful, and finds distinct advantages over air and mud rotary drilling, when drilling or sampling below the water table. When drilling below the water table, air rotary drilling can generate significant quantities of groundwater waste which must be saved, analyzed, treated and disposed of. Sonic drilling, on the other hand, does not require a circulating medium and, thus, groundwater is not brought out of the borehole during drilling. Another problem encountered when using mud rotary drilling is that the mud and fluid can easily become contaminated and cross-contaminate other aquifers. The mud also can impregnate the aquifer and reduce the yield or plug it off from further production.

In a preferred embodiment, the sonic drill string and casing are driven into the formation simultaneously. Although it is preferred to drive the casing and sonically advance the drill string simultaneously, the casing may also be driven before or after the drill string. The drill string is also preferably rotated during sonic vibration to improve the cutting action.

The casing preferably has an inner diameter compatible with the outer diameter of the sample barrel so that spoils and cuttings are minimized or even eliminated altogether. Specifically, the inner diameter of the casing has a diameter which is preferably equal to or less than 4 inches larger than the outer diameter of the sample barrel, more preferably equal to or less than 2 inches larger, and most preferably equal to or less than 1 inch larger than the outer diameter of the sample barrel. When using mud or air rotary casing hammer, the casing must be sized sufficiently larger than the rotary bit and drill pipe so that an annular area is provided between the bit and casing for the circulating medium.

Although an advantage of sonic drilling is the ability to drill without requiring a circulating fluid, a fluid may be introduced for the purpose of enhancing reabsorption of the cuttings into the formation.

In another aspect of the invention, two sonic head assemblies are provided, one for driving the drill string and one for driving the casing. A cable tool assembly is also preferably provided with the drill rig. The cable tool assembly includes a cable and a cable manipulator for manipulating the cable. When using the cable tool assembly, the cable extends through the throughhole in the casing sonic head. The cable tool assembly works in a manner known to those having skill in the art.

Other features and advantages of the invention will appear from the following description in which the preferred embodiments have been set forth in detail in conjunction with the accompanying drawings.

BRIEF DESCRIPTION OF THE DRAWINGS

FIG. 8 shows the casing hammer having a hammer in a retracted position; and

FIG. 9 shows the hammer of FIG. 8 in a driving position.

DESCRIPTION OF THE PREFERRED EMBODIMENTS

Figure 1:
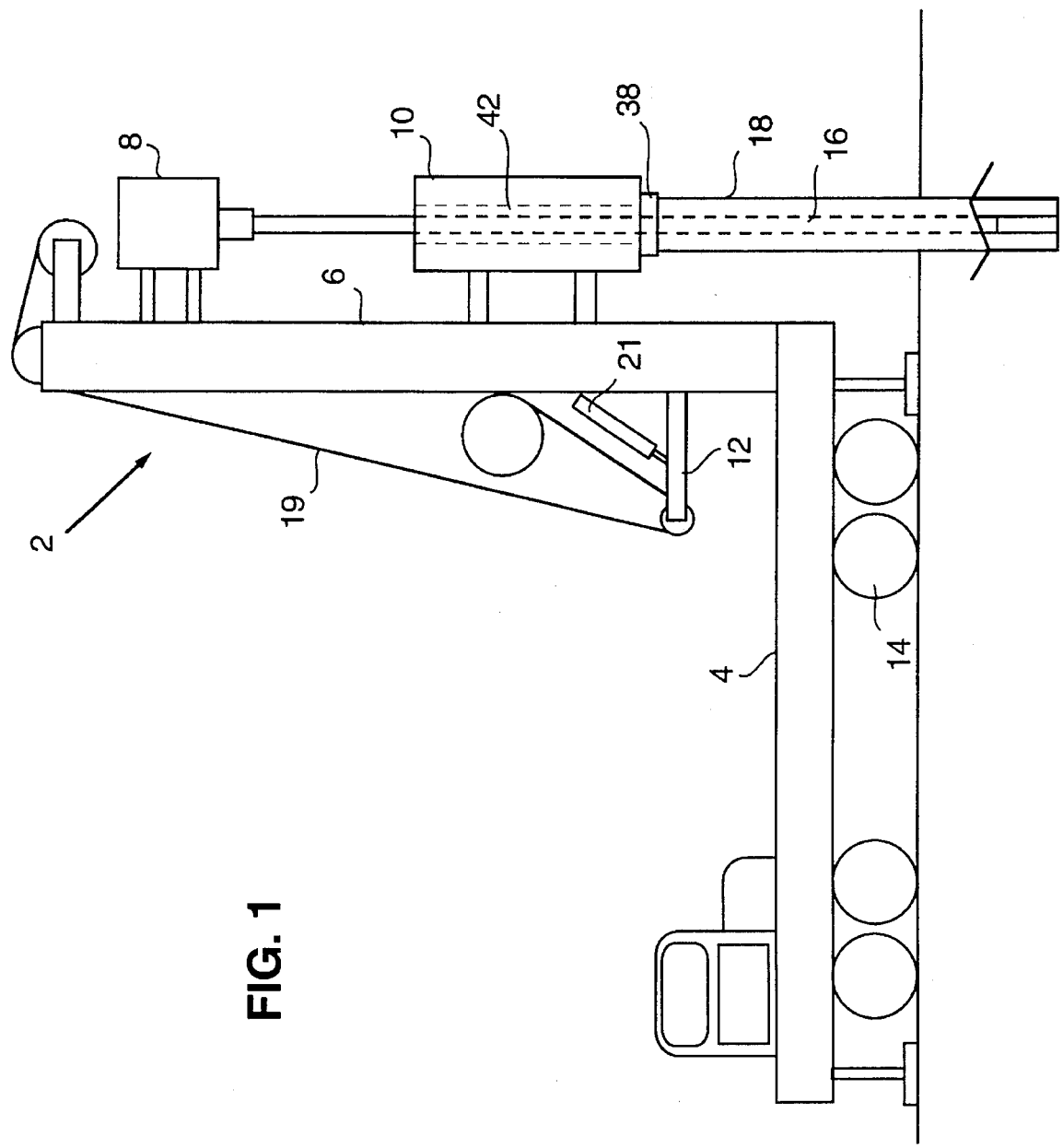
FIG. 1 shows a first, preferred drill rig having a casing hammer, a sonic head, and a cable tool assembly.

A drill rig 2 constructed in accordance with the present invention is shown in FIG. 1. The drill rig 2 includes a carrier 4 having a mast 6 to which is mounted a sonic head 8, a casing hammer 10, and a cable tool assembly 12. The drill rig 2 also has wheels 14 so that it may be moved to various sites.

The sonic head 8 is configured to advance a drill string 16 into a subsurface by inducing vibrations in the drill string 16. The casing hammer 10 is configured to drive a casing 18 into the subsurface with a number of successive blows. The cable tool 12 assembly operates in a manner known to those having skill in the art and may be used for removing spoils from the borehole as described in greater detail below. The cable tool assembly 12 includes a cable 19 and a cable manipulator 21 for manipulating the cable 19.

Figure 2:
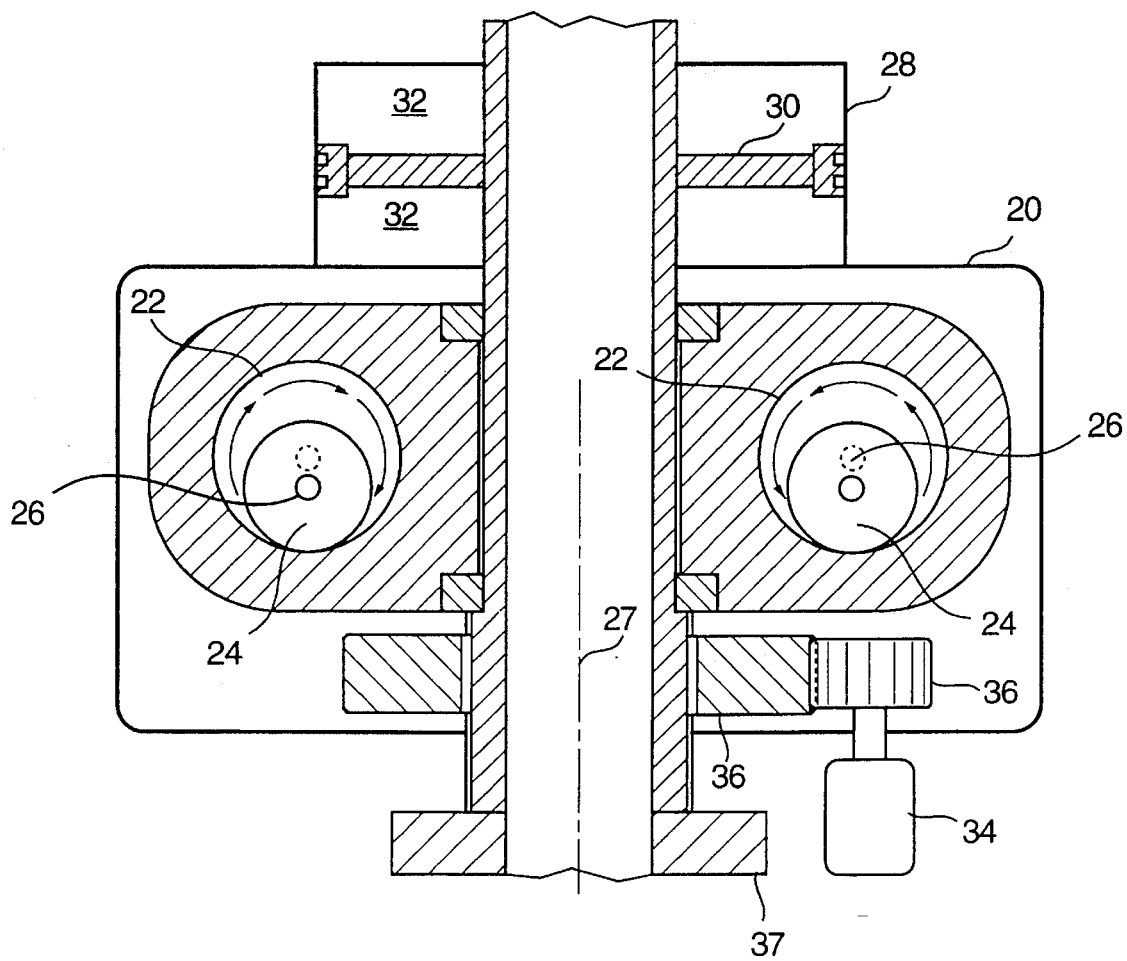
FIG. 2 shows a cross-sectional view of the sonic head of FIG. 1.

Referring to FIG. 2, the sonic head 8 includes an oscillator housing 20 which is coupled to the mast 6. The oscillator housing 20 includes two bores 22 which serve as bearing races. The bores 22 provide orbital pathways for two steel rollers 24 of equal weight. The rollers 24 preferably occupy about ⅔ of the volume of the bores 22.

The rollers 24 are mounted on shafts 26 which are off-center with respect to the bores 22. During operation, the rollers 24 rotate in opposite directions at the same rotational rate and are synchronized so that the rollers 24 are at the bottom and top of the bores 22 at the same time. By timing the rollers 24 in this manner, radial forces are eliminated and only longitudinal forces are imparted on the drill string 16. As will be described in greater detail below, the resulting longitudinal forces produce compressive and expansive pressure waves in the drill string 16 along a longitudinal axis 27 of the drill string 16 for cutting through the formation. The drill string 16 essentially acts as a conduit for storing and transferring the energy from the sonic drill head 8. Although it is preferred to use the sonic head 8 described above, any type of mechanical or electro-mechanical vibrator may be used.

An air spring 28 is attached to the oscillator housing 20 for cushioning the oscillator housing 20 as it cycles through the longitudinal displacements. A piston 30 is attached to the oscillator housing 20 and air chambers 32 are provided above and below the piston 30. The air spring 28 isolates movement and vibration of the oscillator housing 20 from the rest of the drill rig 2 thereby preventing destructive metal to metal contact. The air spring 28 also supports the weight of the suspended drill string 16.

A rotating drive motor 34 and associated gears 36 are provided for rotating the drill string 16. The drill string is connected to the sonic head 8 at an adapter flange 37. The rotating drive motor 34 is used for connecting and disconnecting sections to and from the drill string 16 and for rotating the drill string 16 to assist in drilling. Although it is preferred to rotate the drill string 16 during sonic drilling, the drill string 16 may also be kept rotationally still during drilling.

The drill string 16 is preferably vibrated at a resonant frequency. At the resonant frequency, the vibrations induced in the drill string 16 coincide with the reflected stress waves travelling through the drill string 16. At the resonant frequency, the maximum displacements theoretically and preferably occur at the top and bottom of the drill string 16. The displacements at the bottom of the drill string 16 are attenuated due to the absorption of energy used to drill through the formation. A node of minimum displacement theoretically and preferably occurs at the middle of the drill string 16 since the superimposed pressure waves cancel one another at the midpoint.

Although it is preferred to resonate the drill string 16 at the primary resonant frequency, the drill string 16 may also be resonated at higher order resonant frequencies. The fundamental, or primary, resonant frequency of a length of drill string 16 may be determined by the following formula:

$$\frac{\text{Speed of Sound Through Drill String}}{2 \times \text{Length of Drill String}} = \text{Fundamental Frequency}$$

The formula provides a theoretical fundamental resonant frequency with the drill string 16 longitudinally unrestrained at the top and bottom. The bottom is, of course, restrained by contact with the formation and, thus, the value is only a theoretical calculation. The theoretical calculation will, however, aid the operator of the drill rig 2 to find the actual resonant frequency when the interaction between the drill string 16 and formation is taken into account. Typical frequencies for sonic drilling are between 50 to 200 cycles per second (cps) and more preferably between 80 to 150 cps.

The drill string 16 penetrates the formation by shearing, displacing and/or fracturing the soil under the bottom of the drill string 16. The fluidization of the soil, which typically occurs within a quarter inch of the drill string 16, also reduces frictional forces that constrain the drill string 16 so that the drill string 16 penetrates the subsurface easily. A distinct advantage of sonic drilling is the speed and ease with which the drill string 16 can pass through hard formations.

Referring to FIGS. 8 and 9, the casing hammer 10 has a retractable hammer 11 which is preferably pneumatically-driven, although any other driving mechanisms may be used. The top of the casing 18 is slidably attached to an anvil 38 which is pounded by the hammer to drive the casing 18 into the ground. FIG. 8 shows the hammer in a retracted position and FIG. 9 shows the hammer in a driving position in which the hammer impacts and drives the anvil 38.

Figure 6:
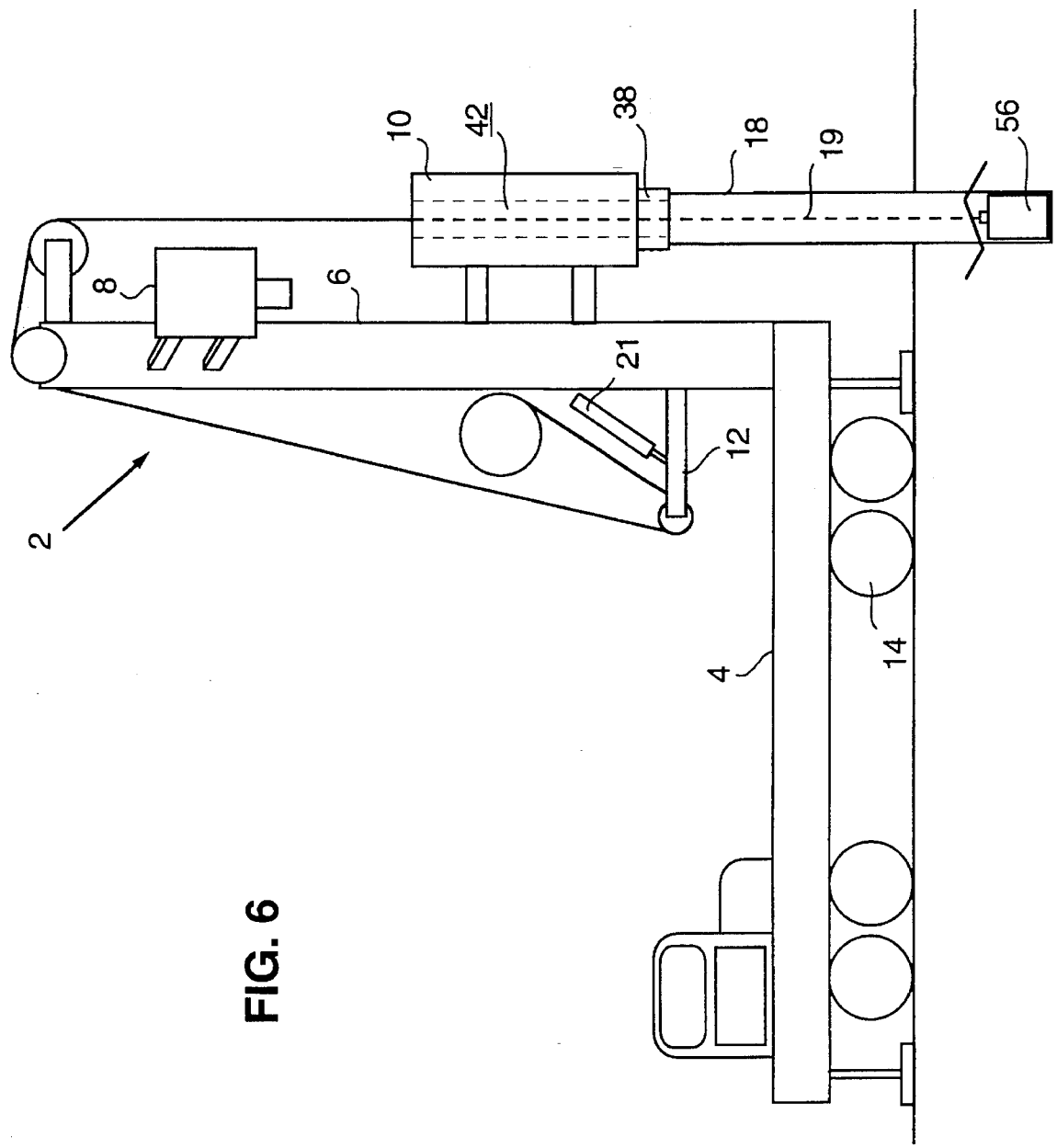
FIG. 6 shows the drill rig of FIG. 1 configured to remove spoils using the cable tool assembly in accordance with the third preferred method.

Referring again to FIG. 1, the bottom of the casing 18 includes a conventional drive shoe (not shown) to aid in penetrating the formation and to protect the bottom end of the casing 18. The casing hammer 10 has a throughhole 42 through which the drill string 16 extends. The sonic head 8 is preferably movably mounted to the carrier 4 between a working position (FIG. 1), in which the drill string extends through the throughhole 42, and a standby position (FIG. 6), in which the drill string 16 is positioned outside the throughhole 42. When the sonic head is in the standby position, the sonic head is positioned away from the centerline of the hole being drilled. The sonic head 8 may be movably mounted to the carrier 4 in any manner and is preferably rotatably coupled to the carrier 4 as shown in FIGS. 1 and 6.

Figure 3:
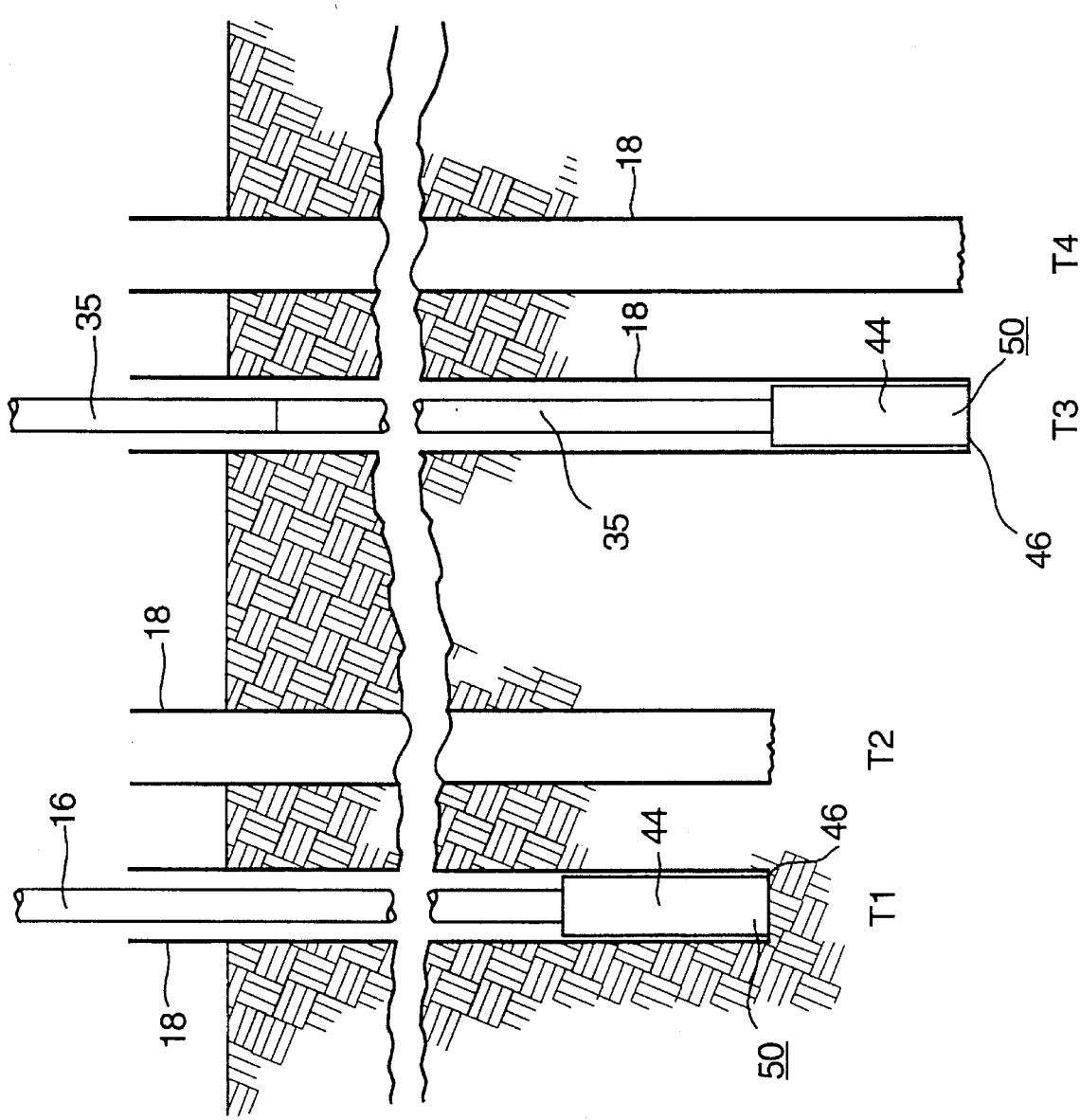
FIG. 3 shows a first preferred method of removing material from a formation in which a sample barrel and casing have compatible sizes so that spoils are minimized.

Referring to FIG. 3, the drill string 16 preferably includes a number of drill rods 35. A preferred drill rod is a 4 ½" OD steel tube having a 10 foot length. The drill rods 35 are threaded at both ends so that a number of drill rods 35 can be connected together to drill to the desired depth. The drill rods are connected together using the motor 34 and associated gears 36 of the sonic drill head 8.

The drill string 16 has a sample barrel 44 connected to one of the drill rods 35 at the downhole end. The sample barrel 44 has a hollow interior 50 into which material from the subsurface enters as the drill string 16 advances through the subsurface. When taking soil samples of the formation, the material is saved for subsequent testing. The sample barrel 44 is preferably formed with two sections along longitudinal split lines (not shown). The two halves of the sample barrel 44 are connected together at the downhole end with a drive shoe 46 and at the uphole end with a cap having a threaded pin which connects to one of the drill rods 35. The drive shoe has an angular cutting edge which facilitates penetration of the formation.

A first, preferred method of removing material from a formation is now described in connection with FIG. 3. As shown in the left-hand part of FIG. 3 marked T1, the drill string 16 and casing 18 are preferably advanced in the formation at the same time. Thus, both the casing hammer 10 and the sonic head 8 are activated to advance the casing 18 and sample barrel 44 simultaneously. The sample barrel 44 is then removed from the formation as indicated at the part of FIG. 3 marked T2. The simultaneous driving of the casing 18 and sample barrel 44 is then repeated as shown at time interval T3 and the sample barrel 44 is retrieved again as shown at interval T4.

Although it is preferred to drive the casing 18 and drill string 16 simultaneously, the drill string 16 and casing 18 may be driven in any order. For example, the sample barrel 44 may be driven ahead of the casing 18 or the casing 18 may be driven before the drill string 16.

The casing 18 preferably has an inner diameter compatible with the outer diameter of the sample barrel 44 so that spoils and cutting are minimized or even eliminated altogether. Specifically, the inner diameter of the casing 18 has a diameter which is preferably equal to or less than 4 inches larger than the outer diameter of the sample barrel, more preferably equal to or less than 2 inches larger, and most preferably equal to or less than 1 inch larger than the outer diameter of the sample barrel 44. As discussed above, sizing the sample barrel 44 and casing 18 in this manner reduces or even eliminates waste products altogether. Since no spoils are produced other than the core itself, no circulating medium is required to remove cuttings.

A second, preferred method of removing material from a formation will now be described in connection with FIG. 4. Although it is preferred to provide the relative dimensions between the casing 18 and drill string 16 as described above, the sample barrel 44 may also be sized smaller relative to the casing 18 than the preferred dimensions. The sample barrel 44 in the second preferred method is preferably smaller than the sample barrel 44 of FIG. 3 so that spoils 52 from the subsurface remain in the casing 18 after removal of the sample barrel 44.

Figure 4:
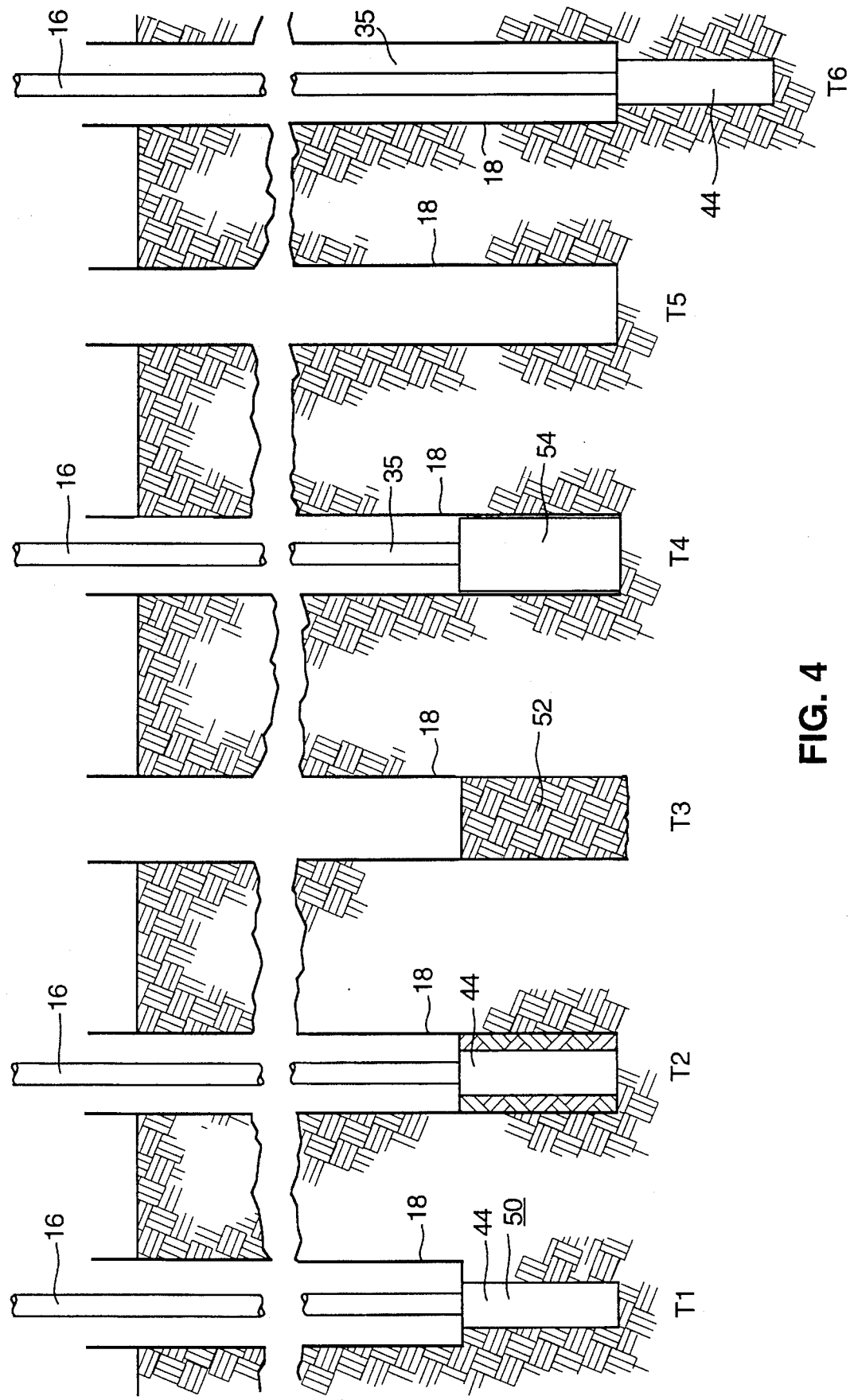
FIG. 4 shows a second preferred method of removing material from a formation in which the spoils are removed with a spoils barrel.

As shown at time interval T1 of FIG. 4, the sample barrel 44 is first sonically driven into the formation to force the soil sample into the hollow interior 50 of the sample barrel 44. The casing 18 is then advanced around the sample barrel 44 as shown at time interval T2. At time interval T3 the sample barrel 44 is removed leaving the spoils 52 behind. A spoils barrel 54 is then attached to the drill string 16 and the spoils 52 are removed as shown at time intervals T4 and T5. The process is then repeated and the sample barrel 44 is lowered into the borehole to retrieve more material as shown at time interval T6. As discussed above in connection with the first preferred method, the order of advancement of the casing 18 and drill string 16 may be in any other order. For example, the casing 18 may be driven before or at the same time as the drive string 16. Although the second preferred method produces spoils 52, the second preferred method still does not require a circulating fluid and, thus, provides an advantage over conventional mud and air rotary casing hammer.

A third preferred method of removing material from a formation will now be described in connection with FIGS. 5 and 6. The third preferred method is substantially the same as the second preferred method except that the spoils 52 are removed using a cable tool clean-out barrel 56 which is operated with the cable tool assembly 12. The cable tool clean-out barrel 56 is a conventional tool and is known to those having skill in the art.

Figure 5:
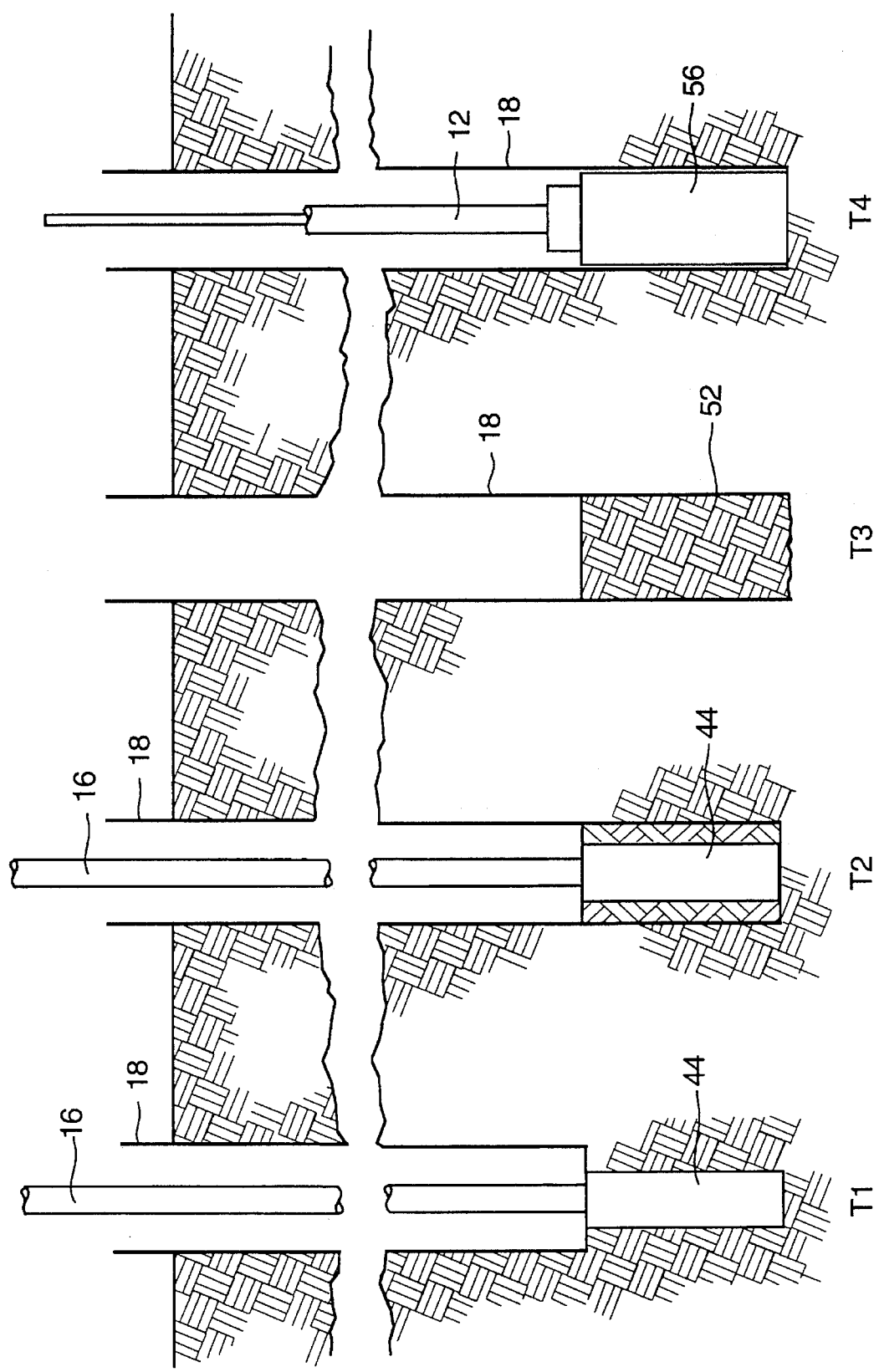
FIG. 5 shows a third preferred method of removing material from a formation in which the spoils are removed using the cable tool assembly.

As shown at time interval T1 of FIG. 5, the sample barrel 44 is first sonically driven into the formation. The casing 18 is then driven around the sample barrel 44 as shown at time interval T2 and the sample barrel 44 is removed as shown at time interval T3. The spoils 52 are then removed with the cable tool clean-out barrel 56 as shown at time interval T4. The cable tool assembly 12 provides an efficient method of removing the spoils since it can be lowered to the bottom of the borehole quickly thereby saving time when drilling or sampling at large depths.

The drill rig 2 is configured as shown in FIG. 6 for removing the spoils 52 during time interval T4 of FIG. 5.

The sonic head 8 and casing hammer 10 are moved to the standby position and the cable 19 of the cable tool assembly 12 is moved over the centerline of the casing 18. The casing hammer 10 is also preferably movably mounted to the carrier 4 so that the throughhole 42 is no longer aligned with the centerline of the casing 18. When the casing hammer is moved to a standby position, the cable 19 does not extend through the throughhole 42 of the casing hammer 10 in a manner similar to the sonic head 8 which is swung out of the way.

Figure 7:
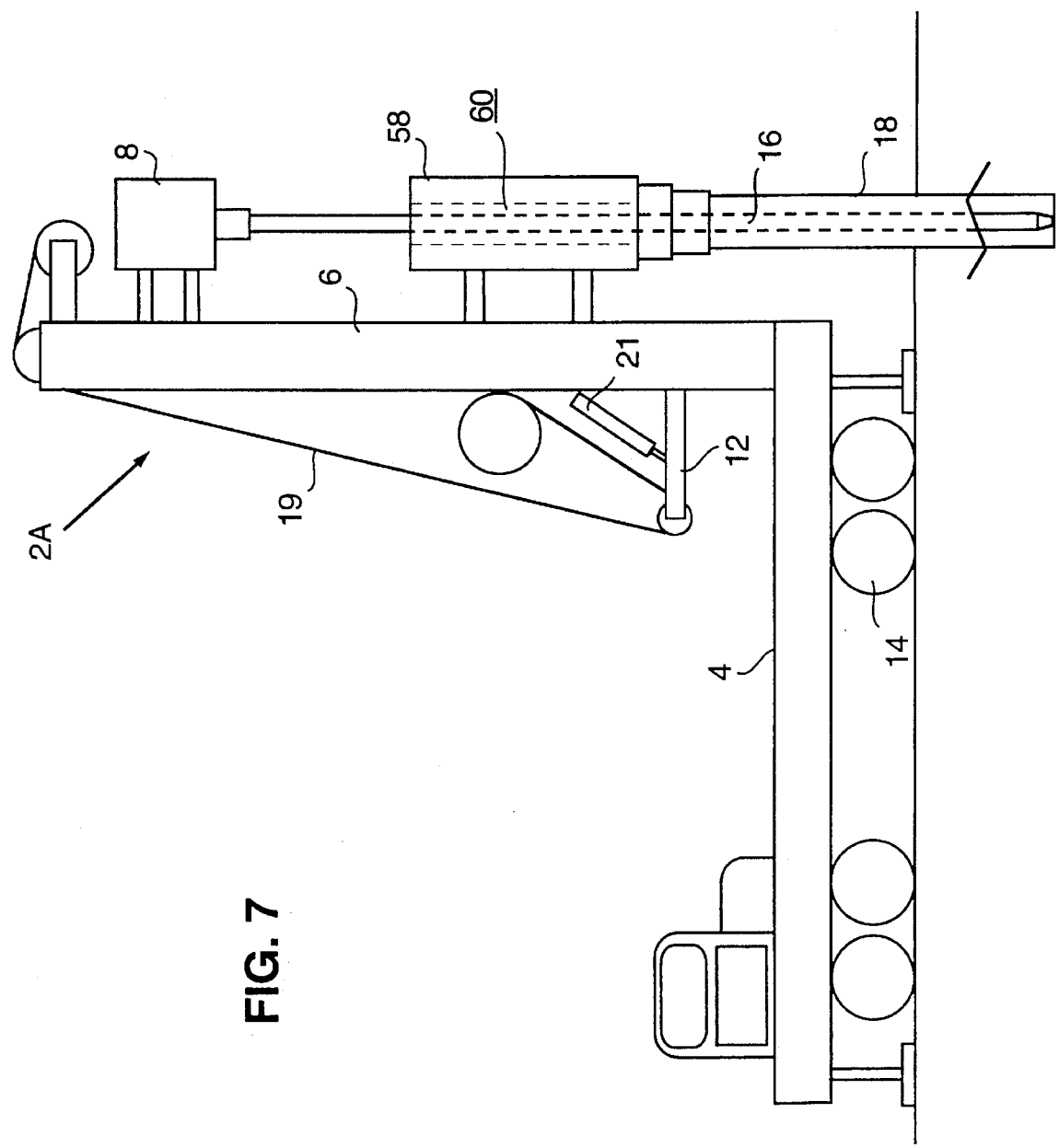
FIG. 7 shows a second, preferred drill rig having a second sonic head for driving the casing.

A second preferred drill rig 2A is shown in FIG. 7. The second preferred drill rig 2A includes a second sonic head 58 for driving the casing 18. The second sonic head 58 is preferably larger or at least the same size as the sonic head 8 described above in connection with FIG. 2. The casing sonic head 58, like the casing hammer 10 of the drill rig 2, includes a throughhole 60 through which the drill string 16 extends. The sonic head 8 is movably mounted to the carrier 4 as described above in connection with the drill rig 2.

The second preferred drill rig 2A may be operated in accordance with any of the three preferred methods with the only difference being that the casing 18 is driven into the formation with the second sonic head 58 rather than the casing hammer 10 of FIG. 1. An advantage of providing the casing sonic head 58 is that the cuttings and spoils are further minimized since the cuttings produced from driving the casing 18 are reabsorbed by the formation as described above.

Modification and variation can be made to the disclosed embodiments without departing from the subject of the invention as defined by the following claims. For example, the drill rods 35 may have any cross-sectional shape other than circular, the spoils may be removed with any other conventional tool, and the methods described herein may be used to provide boreholes for soil gas and groundwater sampling.

I claim:

1. A method of removing material from a subsurface, comprising the steps of:

providing a sonic head and a drill string, the drill string including a sample barrel having an opening at a downhole end leading to a hollow interior, the drill string being coupled to the sonic head at an uphole end, the sonic head being configured to induce vibrations in the drill string for drilling through a subsurface;

driving a hollow casing into the subsurface by pounding the casing with a number of blows;

activating the sonic head so that the vibrations are induced in the drill string; and advancing the drill string into the subsurface during the activating step so that material in the subsurface enters the hollow interior of the sample barrel.

2. The method of removing material from a subsurface of claim 1, further comprising the steps of:

pulling the drill string out of the subsurface and retrieving the material; and saving the material as a soil sample of the formation for subsequent analysis.

3. The method of removing material from a subsurface of claim 1, wherein:

the casing driving step and the drill string advancing step are carried out simultaneously.

4. The method of removing material from a subsurface of claim 1, wherein:

the casing driving step is carried out before the drill string advancing step.

5. The method of removing material from a subsurface of claim 1, further comprising the step of:

pulling the drill string out of the formation after the drill string advancing step; and retrieving spoils from the subsurface after the drill string advancing step, the spoils being a portion of the subsurface remaining between the drill string and the casing after the pulling step.

6. The method of removing material from a subsurface of claim 5, wherein:

the spoils retrieving step is carried out with a cable tool.

7. The method of removing material from a subsurface of claim 1, wherein:

the driving step is carried out with the interior of the casing having a circular cross-section, the circular cross-section having an internal diameter; and the providing step is carried out with the sample barrel including an outer surface having a circular cross-section, the circular cross-section of the drill string having an outer diameter, the outer diameter of the sample barrel being no more than 2 inches smaller than the internal diameter of the casing.

8. The method of removing material from a subsurface of claim 7, wherein:

the providing step is carried out with the outer diameter of the sample barrel being no more than 1 inch smaller than the internal diameter of the casing.

9. The method of removing material from a subsurface of claim 1, wherein:

the drill string advancing step is carried out below a water table of the subsurface.

10. The method of removing material from a subsurface of claim 9, wherein:

the drill string and casing driving steps are performed without circulating a circulating medium through an interior of the casing.

11. A method of removing material from a subsurface, comprising the steps of:

providing a drill string and a sonic head, the drill string being coupled to the sonic head and having a hollow interior at a downhole end, the sonic head being configured to induce vibrations in the drill string for drilling through a subsurface;

driving a casing into the subsurface, the casing having an interior;

activating the sonic head so that the vibrations are induced in the drill string;

advancing the drill string into the subsurface so that material enters the hollow interior during the activating step;

pulling the drill string out of the subsurface;

the casing driving step and sonic drill string advancing step being carried out simultaneously for a period of time.

12. The method of removing material from a subsurface of claim 11, further comprising the steps of:

saving the material as a soil sample of the formation for subsequent analysis.

13. The method of removing material from a subsurface of claim 11, further comprising the step of:

retrieving spoils from the subsurface after the drill string advancing step, the spoils being a portion of the subsurface remaining between the drill string and the casing after the pulling step.

14. The method of removing material from a subsurface of claim 11, wherein:

the driving step is carried out with the interior of the casing having a circular cross-section, the circular cross-section having an internal diameter; and the providing step is carried out with the drill string including an outer surface having a circular cross-section, the circular cross-section of the drill string having an outer diameter, the outer diameter of the sample barrel being no more than 2 inches smaller than the internal diameter of the casing.

15. The method of removing material from a subsurface of claim 14, wherein:

the providing step is carried out with the outer diameter of the sample barrel being no more than 1 inch smaller than the internal diameter of the casing.

16. The method of removing material from a subsurface of claim 11, wherein:

the drill string advancing step is carried out below a water table of the subsurface.

17. The method of removing material from a subsurface of claim 16, wherein:

the drill string and casing driving steps are performed without circulating a circulating medium through the interior of the casing.

18. A method of removing material from a subsurface, comprising the steps of:

providing a drill string and a sonic head, the drill string being coupled to the sonic head and having a hollow interior at a downhole end, the sonic head being configured to induce vibrations in the drill string for drilling through a subsurface;

driving a casing into the subsurface, the casing having an interior;

activating the sonic head so that the vibrations are induced in the drill string;

advancing the drill string into the subsurface so that material enters the hollow interior during the activating step;

pulling the drill string out of the subsurface;

the casing driving step and sonic drill string advancing step being carried out simultaneously for a period of time;

the casing driving step being carried out by pounding the casing into the subsurface with a number of blows.

19. A method of removing material from a subsurface, comprising the steps of:

providing a drill string and a sonic head, the drill string being coupled to the sonic head and having a hollow interior at a downhole end, the sonic head being configured to induce vibrations in the drill string for drilling through a subsurface;

driving a casing into the subsurface, the casing having an interior;

activating the sonic head so that the vibrations are induced in the drill string;

advancing the drill string into the subsurface so that material enters the hollow interior during the activating step;

pulling the drill string out of the subsurface;

the casing driving step and sonic drill string advancing step being carried out simultaneously for a period of time;

retrieving spoils from the subsurface after the drill string advancing step, the spoils being a portion of the subsurface remaining between the drill string and the casing after the pulling step;

the spoils retrieving step being carried out with a cable tool, the cable tool having a cable extending through the interior of the casing.

20. A method of removing material from a subsurface, comprising the steps of:

providing a drill string and a sonic head, the drill string being coupled to the sonic head and having a hollow interior at a downhole end, the sonic head being configured to induce vibrations in the drill string for drilling through a subsurface;

driving a casing into the subsurface, the casing having an interior;

activating the sonic head so that the vibrations are induced in the drill string;

advancing the drill string into the subsurface so that material enters the hollow interior during the activating step;

pulling the drill string out of the subsurface;

the casing driving step and sonic drill string advancing step being carried out simultaneously for a period of time;

introducing a fluid at the downhole end of the drill string; and leaving the fluid in the subsurface so that cuttings produced from the drill string advancing step are reabsorbed into the subsurface.

21. A drill rig for removing material from a subsurface, comprising:

a carrier;

a sonic head mounted to the carrier, the sonic head having a drill string mounted thereto, the sonic head being configured to induce vibrations in the drill string, the drill string defining a longitudinal axis; and a casing hammer being movable along the longitudinal axis in a driving direction and a retracting direction, the hammer being configured to drive a casing into a subsurface when moved in the driving direction.

22. The drill rig for removing material from a subsurface of claim 21, wherein:

the sonic head is movably mounted to the carrier between a working position, in which the drill string extends through a throughhole in the casing, and a standby position, in which the drill string is positioned outside the throughhole.

23. The drill rig for removing material from a subsurface of claim 21, further comprising:

a cable tool assembly mounted to the carrier, the cable tool assembly having an extendable cable and a cable manipulator configured to manipulate the cable.

24. The drill rig for removing material from a subsurface of claim 23, wherein:

the carrier includes a mast, the cable tool assembly, the sonic head and the casing hammer being mounted to the mast.

25. The drill rig for removing material from a subsurface of claim 21, wherein:

the drill string includes a sample barrel having an open end leading to a hollow, cylindrical interior.

26. A drill rig for removing material from a subsurface, comprising:

a carrier;

a first sonic head mounted to the carrier, the sonic head having a drill string mounted thereto, the sonic head being configured to induce vibrations in the drill string, the drill string defining a longitudinal axis, the first sonic head being mounted to the carried so that the first sonic head remains out of a borehole being drilled; and a second sonic head mounted to the carrier, the sonic head being configured to receive a casing and induce vibrations in the casing, the second sonic head being mounted to the carrier so that the second sonic head remains out of the borehole being drilled.

27. The drill rig for removing material from a subsurface of claim 26, further comprising:

a cable tool assembly mounted to the carrier, the cable tool assembly having an extendable cable and a cable manipulator configured to manipulate the cable.

28. The drill rig for removing material from a subsurface of claim 26, wherein:

the drill string includes a sample barrel having an open end leading to a hollow, cylindrical interior.

29. A drill rig for removing material from a subsurface, comprising:

a carrier;

a first sonic head having means for vibrating a drill string and being mounted to the carrier, the drill string being rigidly mounted to the vibrating means, the sonic head being configured to induce vibrations in the drill string, the drill string defining a longitudinal axis; and a second sonic head mounted to the carrier, the sonic head being configured to receive a casing and induce vibrations in the casing;

the second sonic head having a throughhole and the drill string of the first sonic head extending through the throughhole in the second sonic head when in a drilling position.

30. A drill rig for removing material from a subsurface, comprising:

a carrier;

a first sonic head mounted to the carrier, the sonic head having a drill string mounted thereto, the sonic head being configured to induce vibrations in the drill string, the drill string defining a longitudinal axis; and a second sonic head mounted to the carrier, the sonic head being configured to receive a casing and induce vibrations in the casing; and a cable tool assembly mounted to the carrier, the cable tool assembly having an extendable cable and a cable manipulator configured to manipulate the cable;

the cable tool assembly including a spoils barrel configured to remove spoils from a subsurface.

31. A drill rig for removing material from a subsurface, comprising:

a carrier;

a first sonic head mounted to the carrier, the sonic head having a drill string mounted thereto, the sonic head being configured to induce vibrations in the drill string, the drill string defining a longitudinal axis; and a second sonic head mounted to the carrier, the sonic head being configured to receive a casing and induce vibrations in the casing; and a cable tool assembly mounted to the carrier, the cable tool assembly having an extendable cable and a cable manipulator configured to manipulate the cable;

the carrier including a mast, the cable tool assembly and the sonic head being mounted to the mast.

32. A method of removing material from a subsurface, comprising the steps of:

providing a drill string and a sonic head, the drill string being coupled to the sonic head and having a hollow interior at a downhole end, the sonic head being configured to induce vibrations in the drill string for drilling through a subsurface;

driving a casing into the subsurface with a second sonic head, the casing having an interior;

activating the sonic head so that the vibrations are induced in the drill string;

advancing the drill string into the subsurface so that material enters the hollow interior during the activating step; and pulling the drill string out of the subsurface;

the driving and advancing steps being carried out with the drill string and casing having compatible sizes so that no spoils are produced after the driving and advancing steps are completed.

33. The method of claim 32, wherein:

the driving and advancing steps are carried out with the drill string having an external diameter no greater than one inch smaller than an internal diameter of the casing.

34. The method of claim 32, further comprising the step of:

adding a liquid at a downhole end of the drill string so that cuttings from the subsurface are reabsorbed by the formation.

35. The method of claim 32, wherein:

the drill string has an external diameter no greater than one inch smaller than an internal diameter of the casing.

36. A method of removing material from a subsurface, comprising the steps of:

providing a drill string and a sonic head, the drill string being coupled to the sonic head and having a hollow interior at a downhole end, the sonic head being configured to induce vibrations in the drill string for drilling through a subsurface;

driving a casing into the subsurface with a second sonic head, the casing having an interior;

activating the sonic head so that the vibrations are induced in the drill string;

advancing the drill string into the subsurface so that material enters the hollow interior during the activating step;

pulling the drill string out of the subsurface; and rotating the drill string during the advancing step.

37. A drill rig for removing material from a subsurface comprising:

a carrier;

a first sonic head mounted to the carrier, the sonic head having a drill string mounted thereto, the sonic head being configured to induce vibrations in the drill string, the drill string defining a longitudinal axis, the first sonic head being mounted to the carrier so that the first sonic head remains out of a borehole being drilled; and a second sonic head mounted to the carrier, the sonic head being configured to receive a casing and induce vibrations in the casing, the second sonic head being mounted to the carrier so that the second sonic head remains out of the borehole being drilled;

the drill string and casing having compatible sizes so that no spoils are produced when drilling a borehole with the first and second sonic heads.

* * * * *